United States Patent [19]

Iwami et al.

[11] 4,276,388

[45] Jun. 30, 1981

[54] MOLDING RESIN COMPOSITION

[75] Inventors: Etsuji Iwami; Takayuki Saito, both of Hitachi, Japan

[73] Assignee: Hitachi Chemical Company, Ltd., Tokyo, Japan

[21] Appl. No.: 50,520

[22] Filed: Jun. 21, 1979

[30] Foreign Application Priority Data

Jun. 23, 1978 [JP] Japan .................................. 53/76012

[51] Int. Cl.³ ............................................. C08L 67/06
[52] U.S. Cl. ...................................... 525/48; 525/49; 525/445; 525/447; 525/450; 528/301; 528/303; 528/306
[58] Field of Search .................................. 525/48, 49

[56] References Cited

U.S. PATENT DOCUMENTS 2,403,791  7/1946  D'Alelio ............................. 525/48

Primary Examiner—Harold D. Anderson
Attorney, Agent, or Firm—Craig and Antonelli

[57] ABSTRACT

A molding resin composition comprising (a) 40 to 70 parts by weight of an unsaturated polyester, (b) 60 to 20 parts by weight of a dialkyl ester of alkenyl succinic acid, and (c) 0 to 30 parts by weight of a polymerizable monomer other than the component (b) can produce molded articles excellent in mechanical properties, e.g. toughness and coating properties.

10 Claims, No Drawings

MOLDING RESIN COMPOSITION

BACKGROUND OF THE INVENTION

This invention relates to a molding resin composition comprising an unsaturated polyester, a dialkyl ester of alkenyl succinic acid and if necessary, another polymerizable monomer showing high toughness and good coating properties.

Molding resin compositions named BMC (bulk molding compound) and SMC (sheet molding compound) comprising an unsaturated polyester resin as a major component, and one or more termoplastic resins, curing agents, polymerization inhibitors, fillers, coloring agents, thickening agents, fibrous reinforcing materials, and the like are molded into articles having various forms by various molding processes such as compression molding, transfer molding, injection molding, etc. under heat and pressure. These molding materials have advantages in that (1) design freedom is great, (2) corrosion resistance is good, (3) they have electrical insulating properties, (4) weight saving is possible, (5) physical properties can be designed freely, and the like comparing with metal materials, so that they are recently used often as materials for car body from the viewpoint of saving energy.

But since these molding compositions have high molding shrinkage, there arise various defects such as bad surface smoothness, sink marks on the surface of a molded article having a complicated reinforcing structure such as rib and boss, and the like. In order to overcome these defects, there has been proposed a process of using a highly reactive unsaturated polyester resin in combination with a thermoplastic resin such as a poly(methyl methacrylate) series resin, a poly (vinyl acetate) series resin, a poly-ε-caprolactone series resin, a polyethylene series resin, a polystyrene series resin, a saturated polyester series resin, and the like. But according to such a process, although the defects of bad surface smoothness and sink marks are solved, there arises another defect of causing remarkable lowering in toughness. Further, since a large amount of polymerizable monomer having a boiling point near a baking temperature of coating is used in said process, the unreacted polymerizable monomer volatilizes at an interface between a molded article and a coating film at the time of baking the coating film, which generates blisters and remarkably lowers the appearance of the molded article.

Therefore, an unsaturated polyester resin composition having both low shrinkage and toughness together with good coating properties has long been desired.

SUMMARY OF THE INVENTION

It is an object of the present invention to provide an unsaturated polyester resin composition for molding which can provide molded articles excellent in toughness and coating properties.

The present invention provides a molding resin composition comprising (a) 40 to 70 parts by weight of an unsaturated polyester, (b) 60 to 20 parts by weight of a dialkyl ester of alkenyl succinic acid, and (c) 0 to 30 parts by weight of a polymerizable monomer other than the component (b).

DETAILED DESCRIPTION OF THE PREFERRED EMBODIMENT

The unsaturated polyester of the component (a) can be produced by reacting an acid component with an alcohol component using a conventional process.

As the acid component, there can be used $\alpha,\beta$-unsaturated dibasic acids such as maleic acid, maleic anhydride, fumaric acid, itaconic acid, citraconic acid, muconic acid, and the like alone or as a mixture of two or more of them. In addition, if necessary, there can also be used saturated acids such as phthalic anhydride, isophthalic acid, terephthalic acid, hexahydrophthalic anhydride, adipic acid, sebacic acid, dodecanediodic acid, endomethylenetetrahydrophthalic acid, benzoic acid which is used as a conventional stopper, and the like, alone or as a mixture of two or more of them.

As the alcohol component, there can be used polyhydric alcohols such as glycols, e.g. ethylene glycol, propylene glycol, diethylene glycol, dipropylene glycol, 1,3-butanediol, 1,4-butanediol, 1,5-pentanediol, 1,6-hexanediol, neopentyl glycol, 2-methyl-1,3-butanediol, 2,2,4-trimethyl-1,3-pentanediol, hydrogenated bisphenol A, propylene oxide adduct of bisphenol A, etc.; triols, e.g. glycerin, trimethylolpropane, etc., alone or as a mixture of two or more of them.

The dialkyl ester of alkenyl succinic acid of the component (b) can be produced by reacting an alkenyl succinic acid or anhydride with an alcohol in the presence of an acidic catalyst such as sulfuric acid, para-toluenesulfonic acid, a proton type ion exchange resin, etc., at a temperature of preferably 50° to 120° C. for preferably 2 to 6 hours. As the alcohol, that having 1 to 8 carbon atoms such as methyl alcohol, ethyl alcohol, isopropyl alcohol, n-butyl alcohol, and the like can be used. It is preferable to use 3 moles or more of the alcohol per mole of the alkenyl succinic acid or anhydride. The alkenyl succinic acid or anhydride can be prepared, for example, by reacting maleic acid or anhydride with an α-olefin having 1 to 15 carbon atoms with an equal molar amount or an excess of the latter at a temperature of 180° to 220° C. for 3 to 7 hours in the absence or presence of a solvent such as benzone, toluene, xylene, or the like. As the α-olefin, there can be used nonene-1, dodecene, octene-1, isobutylene, diisobutylene, triisobutylene, or the like.

Examples of dialkyl ester of alkenyl succinic acids are dimethyl ester of diisobutenyl succinic acid, dimethyl ester of triisobutenyl succinic acid, and the like. Those having one or more double bonds in the main chain can also be used. These dialkyl esters of alkenyl succinic acids can be used alone or as a mixture thereof. Dimethyl ester of diisobutenyl succinic acid has many isomers and its typical structural formula can be shown as follows:

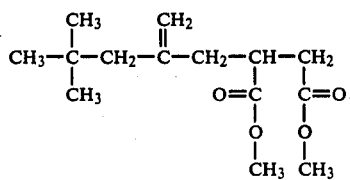

The dialkyl ester of alkenyl succinic acid is used in an amount of 60 to 20 parts by weight per 40 to 70 parts by weight of the unsaturated polyester. If the amount is more than 60 parts by weight, mechanical strength of molded articles is lowered so as to be unsuitable for practical use, whereas if the amount is less than 20 parts by weight, toughness of molded articles is insufficinet.

As the polymerizable monomer, i.e. the component (c), other than the component (b), there can be used any monomers which can be radical polymerized with the unsaturated polyester. Examples of the polymerizable monomers are styrene, α-methylstyrene, chlorostyrene, vinyltoluene, divinyl benzene, diallyl phthalate, diallyl isophthalate, lower esters (methyl or ethyl ester) of acrylic acid or methacrylic acid, vinyl acetate, triallyl isocyanurate, and the like. These polymerizable monomers can be used alone or as a mixture of two or more of them in an amount of 0 to 30 parts by weight per 40 to 70 parts by weight of the unsaturated polyester. It is preferable to use a smaller amount of the polymerizable monomer of the component (c) having a lower boiling point in order to lower the generation of blisters.

The molding resin composition of the present invention may contain a polymerization inhibitor such as hydroquinone, para-benzoquinone, α-naphthoquinone, cathecol, ortho-nitrophenol, or the like.

Further, in the case of providing SMC, BMC, premix, and the like, the molding resin composition of the present invention may further contain one or more curing catalysts, thermoplastic resins, fillers, coloring agents, thickening agents, reinforcing materials, and the like.

As the curing catalysts, there can be use any conventional organic peroxides conventionally used for unsaturated polyesters, e.g., benzoyl peroxide, t-butyl peroxybenzoate, t-butyl peroctoate, dicumyl peroxide, di-t-butyl hydroperoxide, cumene hydroperoxide, methyl ethyl ketone peroxide, and the like.

As the thermoplastic resins, there can be used poly(-methyl methacrylate), poly(vinyl acetate), ethylenevinyl acetate copolymer, poly-ε-caprolactone, polyethylene, polystyrene, saturated polyester, acrylonitrile-styrene copolymer, polyvinyl chloride, vinyl chloride-vinyl acetate copolymer, polybutadiene, polypropylene, and the like.

As the fillers, coloring agents, thickening agents, reinforcing materials, any conventional ones can be used.

The present invention is illustrated by way of the following Examples, in which all parts and percents are by weight unless otherwise specificed.

EXAMPLE 1

| Maleic anhydride | 7.5 moles |
|---|---|
| Isophthalic acid | 2.5 moles |
| Propylene glycol | 11.0 moles |
| Hydroquinone | 0.01% based on the total amount of the above three ingredients |

The above-mentioned ingredients were reacted according to a conventional process (reaction temperature 200° C.) until an acid number became 25 to give an unsaturated polyester (A). The unsaturated polyester (A) in an amount of 60 parts was dissolved in 40 parts of dimethyl ester of diisobutenyl succinic acid to give an unsaturated polyester resin (I).

EXAMPLE 2

The unsaturated polyester (A) obtained in Example 1 in an amount of 60 parts was dissolved in a mixture of 30 parts of dimethyl ester of diisobutenyl succinic acid and 10 parts of styrene monomer to give an unsaturated polyester resin (II).

COMPARATIVE EXAMPLE 1

The unsaturated polyester (A) obtained in Example 1 in an amount of 60 parts was dissolved in 40 parts of styrene monomer to give an unsaturated polyester resin (III).

COMPARATIVE EXAMPLE 2

| Fumaric acid | 7.5 moles |
|---|---|
| Terephthalic acid | 2.5 moles |
| Propylene glycol | 6.0 moles |
| Dipropylene glycol | 5.0 moles |
| Hydroquinone | 0.01% based on the total amount of the above four ingredients |

The above-mentioned ingredients were reacted in the same manner as described in Example 1 to give an unsaturated polyester (B). The unsaturated polyester (B) in an amount of 60 parts was dissolved in 40 parts of styrene monomer to give an unsaturated polyester resin (IV).

To each unsaturated polyester resin I, II, III, and IV obtained in Examples 1 and 2, and Comparative Examples 1 and 2, 1% of benzoyl peroxide was added and cured by heating at 80° C. to give casted plates to 3 mm thick. Using these casted plates, mechanical strengths were measured according to JIS K 6919 and K 6911 (impact strength) at 25° C.

The results are as shown in Table 1.

In the above-mentioned Examples, dimethyl ester of diisobutenyl succinic acid was produced by reacting one mole of diisobutenyl succinic anhydride with 4 moles of methanol in the presence of paratoluenesulfonic acid at a temperature of 70° to 80° C. for 4 hours, neutralizing the resulting reaction product, washing with water and distilling it.

TABLE 1

| | | Examples | | Comparative Examples | |
|---|---|---|---|---|---|
| Unsaturated polyester resin | | I | II | III | IV |
| Flexural strength | kg/mm$^2$ {N/mm$^2$} | 13.8 {135} | 12.6 {123} | 10.2 {100} | 11.8 {116} |
| Flexural modulus | kg/mm$^2$ {N/mm$^2$} | 280 {2744} | 300 {2940} | 410 {4018} | 360 {3528} |
| Tensile strength | kg/mm$^2$ {N/mm$^2$} | 4.9 {48} | 4.5 {44} | 3.0 {29} | 3.8 {37} |
| Elongation in tension | % | 8.0 | 7.5 | 3.1 | 4.9 |
| Impact strength | kg . cm/cm$^2$ {J/cm$^2$} | 13.8 {1.35} | 12.6 {1.24} | 9.2 {0.90} | 10.0 {0.98} |

As is clear from Table 1, the unsaturated polyester resins I and II containing dimethyl ester of diisobutenyl succinic acid are greater in elongation, flexural strength, tensile strength and impact strength than those of Comparative Examples and thus remarkably improved in toughness.

In the next place, four kinds of SMC were prepared by using the unsaturated polyester resins obtained in Examples 1 and 2 and Comparative Examples 1 and 2 and other ingredients as listed in Table 2 under the ageing condition as listed in Table 2.

TABLE 2

| Formulation | parts |
|---|---|

TABLE 2-continued

| Unsaturated polyester resin | 100 |
|---|---|
| A styrene solution containing 30% of polystyrene | 30 |
| tert-Butyl peroxybenzoate | 1.0 |
| para-Benzoquinone | 0.007 |
| Calcium carbonate | 100 |
| Zinc stearate | 5 |
| Magnesium oxide | 1.0 |
| Chopped strand glass, 1 inch long | 100 |

| Ageing conditions | |
|---|---|
| Temperature | 40° C. |
| Time | 24 hours |

These four kinds of SMC were compression molded at a mold temperature of 145° C. under a molding pressure of 60 kg/cm$^2$ (590 N/cm$^2$) for 3 minutes of press time to give flat plates of 3 mm thick. Mechanical properties of these plates were measured and listed in Table 3.

These flat plates were also coated with coating compositions as listed in Table 4 under the coating conditions as listed in Table 4 to observe the generation of blisters by the naked eye. The results obtained are also listed in Table 3.

TABLE 4

| Coating | Under coating: Alkyd series coating<br>Top coating: Melamine-alkyd series coating |
|---|---|
| Coating conditions | Degreasing (isopropyl alcohol) → Washing with water → Drying (150° C./10 min.) → Under coating → Setting (25° C./10 min.) → Baking (150° C./30 min.) → Wet sanding (#400 sand paper) → Drying (150° C./10 min.) → Top coating → Setting (25° C./10 min.) → Baking (150° C./30 min.) |

TABLE 3

| Unsaturated polyester resin | | Examples | | Comparative Examples | |
|---|---|---|---|---|---|
| | | I | II | III | IV |
| Flexural strength | kg/mm$^2$ | 20.4 | 19.6 | 17.3 | 18.7 |
| | {N/mm$^2$} | {200} | {192} | {170} | {183} |
| Flexural modulus | kg/mm$^2$ | 867 | 918 | 1230 | 1120 |
| | {N/mm$^2$} | {8.5 × 10$^3$} | {9.0 × 10$^3$} | {1.21 × 10$^4$} | {1.1 × 10$^4$} |
| Tensile strength | kg/mm$^2$ | 12.0 | 11.8 | 8.5 | 10.6 |
| | {N/mm$^2$} | {118} | {116} | {83} | {104} |
| Vibration fatigue[*1] | 10$^7$ times, fatigue strength | kg/mm$^2$ | 8.5 | 8.0 | 5.0 | 5.8 |
| | 10$^7$ times, fatigue strength | {N/mm$^2$} | {83} | {78} | {49} | {57} |
| | Fatigue strength ratio | — | 0.415 | 0.408, | 0.286 | 0.310 |
| Izod impact strength (no hotch) | ft . lb | 26.2 | 24.3 | 14.8 | 21.9 |
| | {J/m} | {1.4 × 10$^3$} | {1.3 × 10$^3$} | {7.9 × 10$^2$} | {1.2 × 10$^2$} |
| Generation of blisters[*2] | | No | No | Yes | Yes |

Note
[*1]: According to the cantilever flexural fatigue test method.
[*2]: Observed by the naked eye immediately after baking the top coating at 150° C. for 30 minutes.

As is clear from the results in Table 3, the molded articles produced by using the molding resin compositions of the present invention are superior in mechanical properties, particularly in vibration fatigue test and Izod impact strength and are improved remarkably in toughness comparing with the conventional molding resin compositions.

Further, there arises no blister when coating films are formed on the molded articles produced by using the resin compositions of the present invention.

What is claimed is:

1. A molding resin composition comprising:
   (a) 40 to 70 parts by weight of an unsaturated polyester of at least one α,β-ethylenically unsaturated dicarboxylic acid or a mixture of said dicarboxylic acid with at least one saturated dicarboxylic acid, with a polyhydric alcohol,
   (b) 60 to 20 parts by weight of a dialkyl ester of alkenyl succinic acid, and
   (c) 0 to 30 parts by weight of a ethylenically unsaturated monomer.
2. A composition according to claim 1, wherein the dialkyl ester of alkenyl succinic acid is produced by reacting an alkenyl succinic acid or anhydride with an alcohol having 1 to 8 carbon atoms.
3. A composition according to claim 2, wherein the alcohol is methanol, ethanol, isopropanol or n-butanol.
4. A composition according to claim 2, wherein the alkenyl succinic acid or anhydride is diisobutenyl succinic acid or anhydride, triisobutenyl succinic acid or anhydride.
5. A composition according to claim 1, wherein the ethylenically unsaturated monomer is styrene, α-methylstyrene, chlorostyrene, vinyltoluene, divinyl benzene, diallyl phthalate, diallyl isophthalate, methyl methacrylate, methyl acrylate, ethyl methacrylate, ethyl acrylate, vinyl acetate, triallyl isocyanurate, or a mixture thereof.
6. A composition according to claim 1, wherein the dialkyl ester of alkenyl succinic acid or anhydride is dimethyl ester of diisobutenyl succinic anhydride.
7. A composition according to claim 1, wherein said unsaturated polyester is a reaction product of maleic anhydride, isophthalic acid and propylene glycol.
8. A composition according to claim 1, wherein said ethylenically unsaturated monomer is styrene.
9. A composition according to claim 8, comprising:
   (a) 60 parts by weight of the unsaturated polyester,
   (b) 30 parts by weight of an dialkyl ester of alkenyl succinic acid, and
   (c) 10 parts by weight of styrene.
10. A composition according to claims 1 or 9, additionally comprising one or more polymerization inhibitor, curing catalysts, thermoplastic resins, fillers, coloring agents, thickening agents and reinforcing materials.

* * * * *